United States Patent
Chen et al.

(10) Patent No.: US 7,992,077 B2
(45) Date of Patent: Aug. 2, 2011

(54) DATA SLICER HAVING AN ERROR CORRECTION DEVICE

(75) Inventors: Chieh-Cheng Chen, Changhua County (TW); Ho-Lin Wang, Taoyuan County (TW); Ting Chiou, Taipei County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 922 days.

(21) Appl. No.: 11/944,433

(22) Filed: Nov. 22, 2007

(65) Prior Publication Data

US 2009/0044087 A1 Feb. 12, 2009

(30) Foreign Application Priority Data

Aug. 9, 2007 (TW) ................................ 96129396 A

(51) Int. Cl.
*G06F 7/02* (2006.01)
*G06F 11/00* (2006.01)

(52) U.S. Cl. ........................ 714/819; 714/704
(58) Field of Classification Search .................. 714/704, 714/746, 819, 800, 801, 803
See application file for complete search history.

(56) References Cited

U.S. PATENT DOCUMENTS

| 4,133,980 A | * | 1/1979 | Moed ............................ 370/522 |
| 4,962,501 A | * | 10/1990 | Byers et al. ................... 714/805 |
| 6,380,969 B1 | | 4/2002 | Limberg |
| 6,445,792 B1 | * | 9/2002 | Shiraki et al. ................ 370/286 |
| 6,608,871 B2 | | 8/2003 | Popplewell |

FOREIGN PATENT DOCUMENTS

| JP | 5668062 | 6/1981 |
| TW | I268704 | 12/2006 |

* cited by examiner

*Primary Examiner* — Phung M Chung
(74) *Attorney, Agent, or Firm* — Winston Hsu; Scott Margo

(57) ABSTRACT

A data slicer includes an error bit predictor, a DC level compensator, a co-channel detector, and an output device. The data slicer generates four bytes according to four slicing levels respectively. The four slicing levels are a DC level, a level generated by adding a predetermined offset to the DC level, a level generated by subtracting the predetermined offset from the DC level, and a compensated level generated by the DC level compensator. The co-channel detector determines if the compensated level has the co-channel interference. The output device generates an output byte according to indication signals generated by the co-channel detector and the error bit predictor and the parity check of the four bytes.

12 Claims, 7 Drawing Sheets

DATA SLICER HAVING AN ERROR CORRECTION DEVICE

BACKGROUND OF THE INVENTION

1. Field of the Invention

The present invention relates to a data slicer, and more particularly, to a data slicer having an error correction device.

2. Description of the Prior Art

In a general display, display frames are carried by a signal, which can be divided into vertical parts and horizontal parts. The horizontal parts represent the pixel data of each horizontal line. The vertical parts represent the display frames. The relevant standards refer to the Generalized Timing Formula (GTF) of the Video Electronics Standards Association (VESA).

To enable the display to correctly distinguish pixel data of each frame, a blanking signal is inserted between each frame. The blanking signal is composed of a front porch signal, a vertical synchronous signal, and a back porch signal. The horizontal line signals included in the front and the back porch signals are referred to as a Vertical Blanking Interval (VBI) signal. The VBI signal is utilized for transmitting control signals of frames or some data. For example, In NTSC systems, the VBI signal comprises 21 horizontal line signals, where the horizontal line signals 1 to 9 are reserved to transmit TV timing signals, and horizontal line signals 10 to 21 are reserved to transmit data signals such as teletext signals or caption signals. In PAL systems, a similar mechanism using VBI signals to transmit teletext signals and caption signals also exists.

Therefore, a general digital display has an internal VBI slicer for capturing texts, widescreen signaling signals, or VBI signals of other standards. In the prior art, the VBI slicer comprises a digital PLL and has a function of slicing level estimation. The digital PLL is utilized to lock the phase of received signals for synchronization. The function of the slicing level estimation is utilized for determining the received data as being '1' by estimating if the received data is higher than a high level or as being '0' by estimating if the received data is lower than a low level. However, during transmission, the amplitudes and phases of the transmitted signals are distorted because of the noises and channel effects such as thermo noise or Inter-Symbol Interference (ISI). Thus, for the digital PLL, it is hard to lock the phases of the received signals, and therefore slicing level estimation might cause incorrect determination and result in high bit-error rates.

SUMMARY OF THE INVENTION

It is therefore a primary objective of the claimed invention to provide a data slicer having an error correction device for solving the above-mentioned problem.

The present invention provides a data slicer having an error correction device. The data slicer comprises a first subtractor for subtracting a first level signal from a first data signal to generate a second data signal; a first serial to parallel converter coupled to the first subtractor for generating a first byte according to a sign bit of the second data signal; a level compensator coupled to the first subtractor for adjusting an offset of the first level signal according to the second data signal to generate a second level signal; a first comparator coupled to the level compensator for comparing the second level signal with the first data signal to generate a first comparing signal; a second serial to parallel converter coupled to the first comparator for converting the first comparing signal to a second byte; a co-channel detector coupled to the level compensator for determining co-channel interference according to difference between maximum and minimum of the second level signal to generate a first indication signal; an error bit predictor coupled to the first subtractor for indicating an error bit of the first byte to generate a second indication signal; and an output device for outputting the first byte or the second byte according to the first indication signal, a parity check of the first byte, and a parity check of the second byte, or for outputting the corrected first byte according to the second indication signal.

The present invention further provides a data slicer having error correction device. The data slicer comprises a first subtractor for subtracting a first level signal from a first data signal to generate a second data signal; a first serial to parallel converter coupled to the first subtractor for generating a first byte according to a sign bit of the second data signal; a first adder for adding a predetermined offset to the first level signal; a first comparator coupled to the first adder for comparing output signal of the first adder with the first data signal to generate a first comparing signal; a second serial to parallel converter coupled to the first comparator for converting the first comparing signal to a second byte; a second subtractor for subtracting the predetermined offset from the first level signal; a second comparator coupled to the second subtractor for comparing output signal of the second subtractor with the first data signal to generate a second comparing signal; a third serial to parallel converter coupled to the second comparator for converting the second comparing signal to a third byte; an error bit predictor coupled to the first subtractor for indicating an error bit of the first byte to generate a first indication signal; and an output device for outputting the first byte, the second byte, or the third byte according to a parity check of the first byte, a parity check of the second byte, and a parity check of the third byte, or for outputting a corrected first byte according to the first indication signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
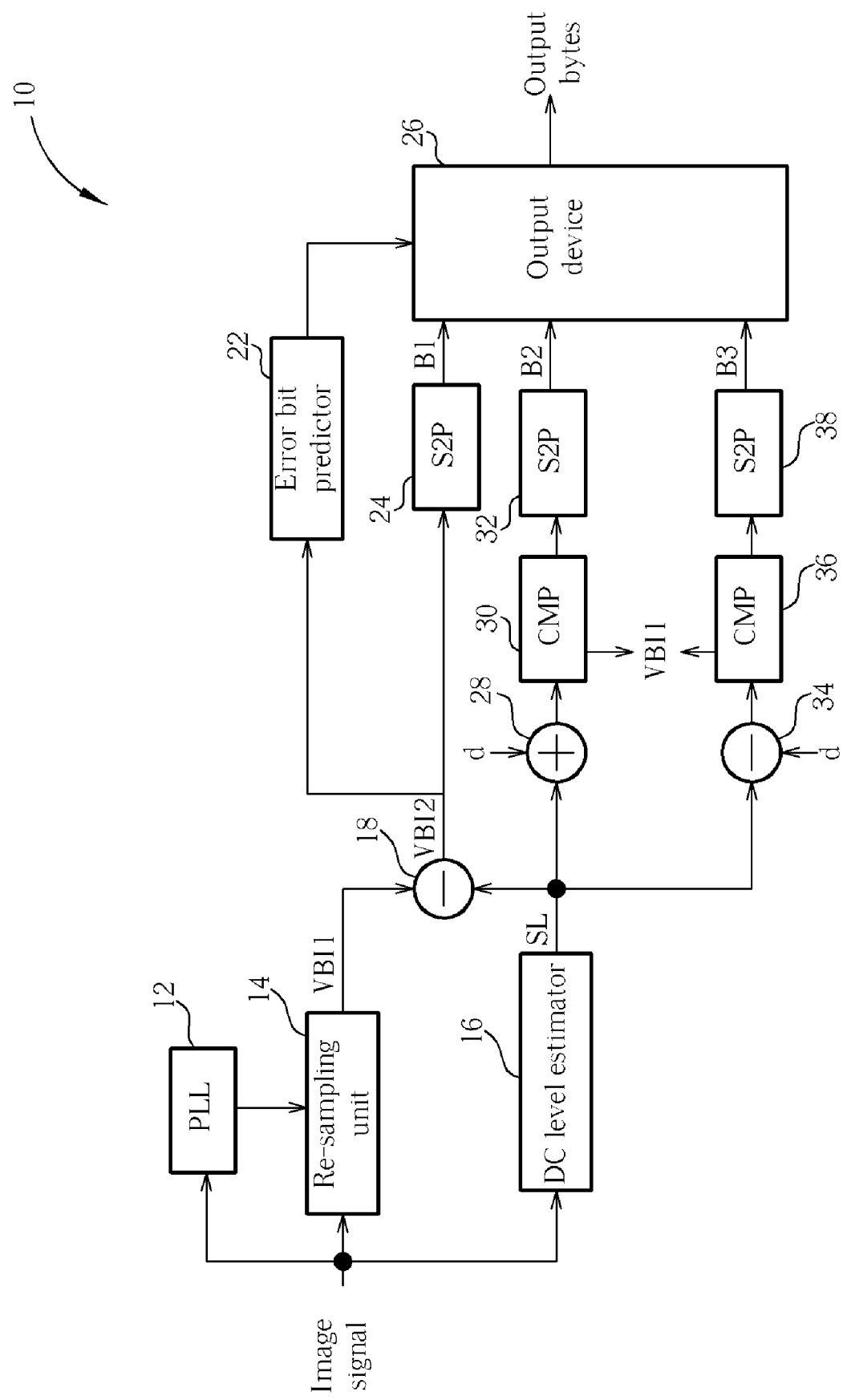
FIG. 1 is a diagram illustrating a data slicer having an error correction device according to a first embodiment of the present invention.

Please refer to FIG. 1. FIG. 1 is a diagram illustrating a data slicer having an error correction device according to a first embodiment of the present invention. The data slicer 10 comprises a PLL 12, a re-sampling unit 14, a DC level estimator 16, a first subtractor 18, an error bit predictor 22, a first serial to parallel (S2P) converter 24, an output device 26, a first adder 28, a first comparator (CMP) 30, a second S2P converter 32, a second subtractor 34, a second CMP 36, and a third S2P converter 38. The re-sampling unit 14 re-samples an image signal according to the sampling clock signal generated by the PLL 12 to generate a first data signal VBI1. The first data signal VBI1 contains VBI data. The DC level SL is generated by the DC level estimator 16 by calculating the first data signal VBI1 during the sampling period. Theoretically, the DC level SL is used as the slicing level of the VBI. However, because of the inaccuracy of the DC level SL contributed by noises and signal interferences, the Bit Error Rate (BER) of the determination according to the DC level SL increases substantially. Furthermore, if the eyeheights of bad signals are too small, the accuracy of the slicing level becomes very critical.

Figure 2:
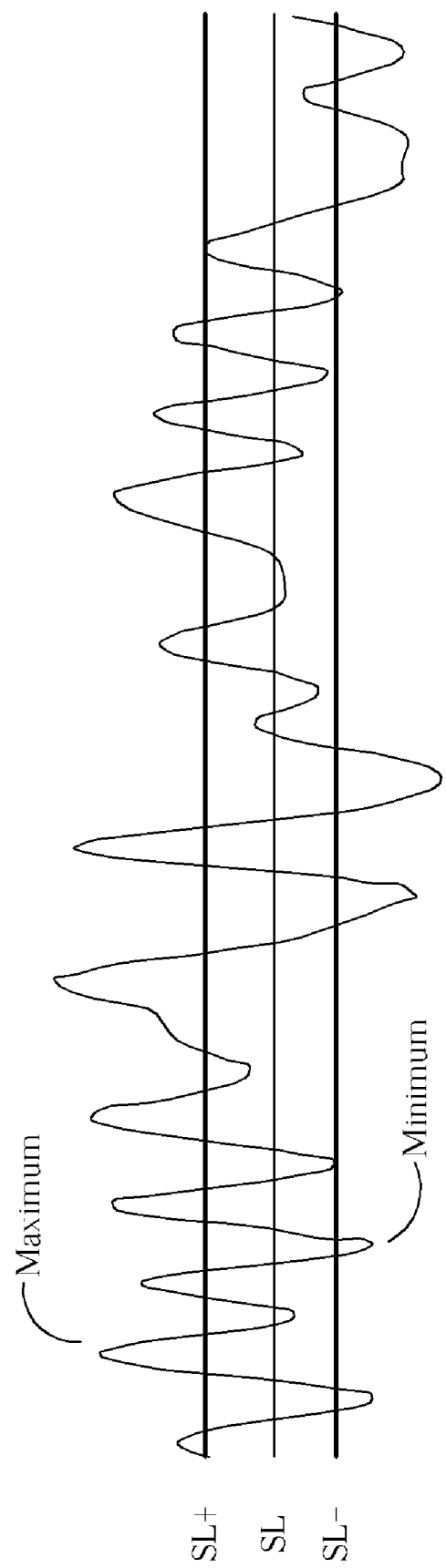
FIG. 2 is a diagram illustrating the DC level of the image.

Please refer to FIG. 2. FIG. 2 is a diagram illustrating the DC level of the image signal. The first embodiment of the present invention utilizes the DC levels SL+ and SL− to reduce the BER. The DC levels SL+ is generated from the DC level SL adding an offset d. Furthermore, the DC level SL− is generated from the DC level SL subtracting the offset d. The size of the offset d can be one-fourth or one-eighth of the amplitude of the DC level SL, or can be any other proportion. The first subtractor 18 subtracts the DC level SL from the first data signal VBI1 to generate the second data signal VBI2. The sign bit of the second data signal VBI2 is converted by the first S2P converter 24 to form the first byte B1. The sign bit of the second data signal is substantially the same as the result of the first data signal VBI1 compared with the DC level SL. Hence, in this embodiment, the comparator can be replaced by a subtractor and a S2P converter (which is used to derive the sign bits of the result generated by the subtractor).

The first CMP 30 compares the DC level SL+ with the first data signal VBI1 so as to generate a first comparing signal. The second S2P converter 32 converts the first comparing signal to a second byte B2. The second comparator 36 compares the DC level SL− with the first data signal VBI1 so as to generate a second comparing signal. The third S2P converter 38 converts the second comparing signal to a third byte B3. The output device 26 at first determines if the parity check of the first byte B1 is correct. If it is correct, the byte B1 is outputted. If the parity check of the first byte B1 is incorrect, the output device 26 then determines if the parity checks of the second and the third bytes B2 and B3 are correct. If the parity check of the second byte B2 is correct, it is certain that the parity check of the third byte B3 is incorrect, and vice versa. It is because the second and third bytes B2 and B3 are respectively the results of the first data signal VBI1 compared with the DC level SL+ and the first data signal VBI1 compared with the DC level SL−, and consequently the second and the third bytes B2 and B3 are mutually exclusive to each other. The output device 26 outputs bytes corresponding to the correct parity check. When the parity checks of the first, second, and third bytes B1, B2, and B3 are all incorrect, the output device 26 inverts the incorrect bits of the first byte B1 according to the indication signal generated by the error bit predictor 22 and outputs the corrected bytes. It should be noted that the error bit predictor 22 only predicts one bit error at a time, which means that the error bit predictor 22 cannot predict more than one error.

Figure 3:
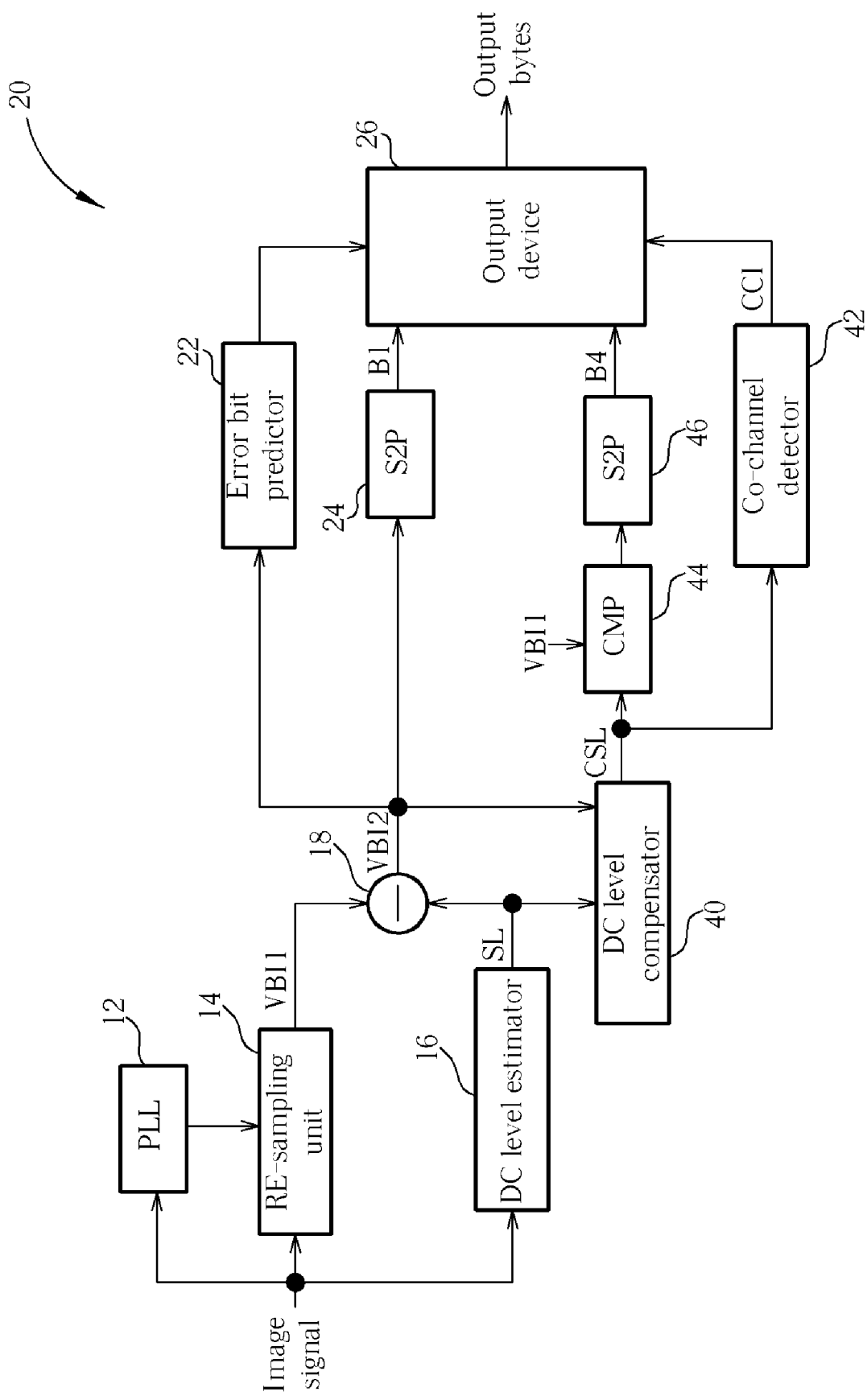
FIG. 3 is a diagram illustrating a data slicer having an error correction device according to a second embodiment of the present invention.

Please refer to FIG. 3. FIG. 3 is a diagram illustrating a data slicer having an error correction device according to a second embodiment of the present invention. The second embodiment of the present invention is similar to the first embodiment of the present invention. The main difference between them is that the data slicer 20 comprises a DC level compensator 40, a co-channel detector 42, a third CMP 44, and a fourth S2P converter 46. When the signals are affected by the co-channel interference or other interferences, it might cause fast variations of the DC level, which affects the accuracy of the estimated slicing level during the sampling period. In the second embodiment, the DC level compensator 40 dynamically updates the slicing level to generate a compensating level CSL. The third CMP 44 compares the compensating level CSL with the first data signal VBI1 to generate a third comparing signal. The fourth S2P converter 46 converts third comparing signal to a fourth byte B4. The co-channel detector 42 determines if the co-channel interference exists according to the difference between the maximum and the minimum of the compensating level of one image signal line. If the co-channel interference exists, the indication signal CCI of the co-channel detector 42 becomes '1' such that the output device 26 first determines if the parity check of the fourth byte B4 is correct. Here, if the parity check of the fourth byte B4 is correct, the fourth byte B4 is directly outputted. Further, if the parity check of the fourth byte B4 is incorrect, the output device 26 then determines if the parity check of the first byte B1 is correct. When the parity check of the first byte B1 is correct, the first byte B1 is directly outputted. If the parity check of the first byte B1 is incorrect, the output device 26 inverts the error bits of the first byte B1 according to the indication signal of the error bit predictor 22 and outputs the corrected byte.

Figure 4:
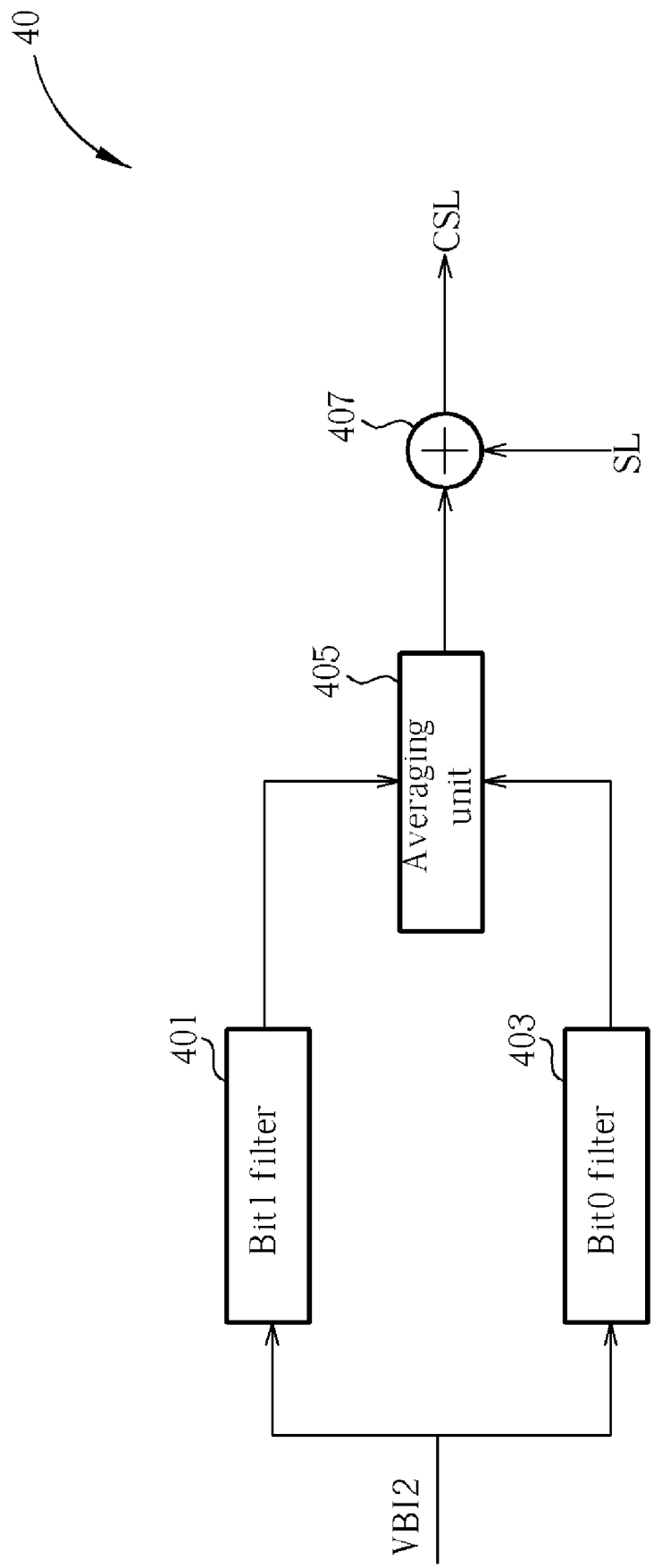
FIG. 4 is a diagram illustrating a level compensator of FIG. 3.

Please refer to FIG. 4. FIG. 4 is a diagram illustrating a level compensator of FIG. 3. The level compensator 40 adjusts the offset of the level SL according to the second data signal VBI2 such that the compensating level CSL is generated. The level compensator 40 comprises a bit 1 filter 401, a bit 0 filter 403, an averaging unit 405, and a second adder 407. The bit 1 filter 401 filters the part of the second data signal VBI2 higher than the DC level SL. The bit 0 filter 403 filters the part of the second data signal VBI2 that is lower than the DC level SL. The bit 1 and bit 0 filters 401 and 403 can be adjustable low-pass filters. The response time of the offset can be controlled by adjusting the bandwidth of the filter. That is, when the bandwidth of the filter is wide, the response time is fast, but the signals are easily affected by noise. When the bandwidth of the filter is narrow, the response is slow, but the signals are not easily affected by noise. When the DC level SL is set too high, the difference between the second data signal VBI2 determined to be '1' and the DC level SL is smaller than the difference between the second data signal VBI2 determined to be '0' and the DC level SL, and vice versa. Therefore, the outputs of the bit 1 and bit 0 filters 401 and 403 are input to the averaging unit 405 such that the averaging unit 405 averages the outputs to generate an estimated offset accordingly. Finally, the second adder 407 adds the estimated offset to the DC level SL to generate the compensating level CSL.

Figure 5:
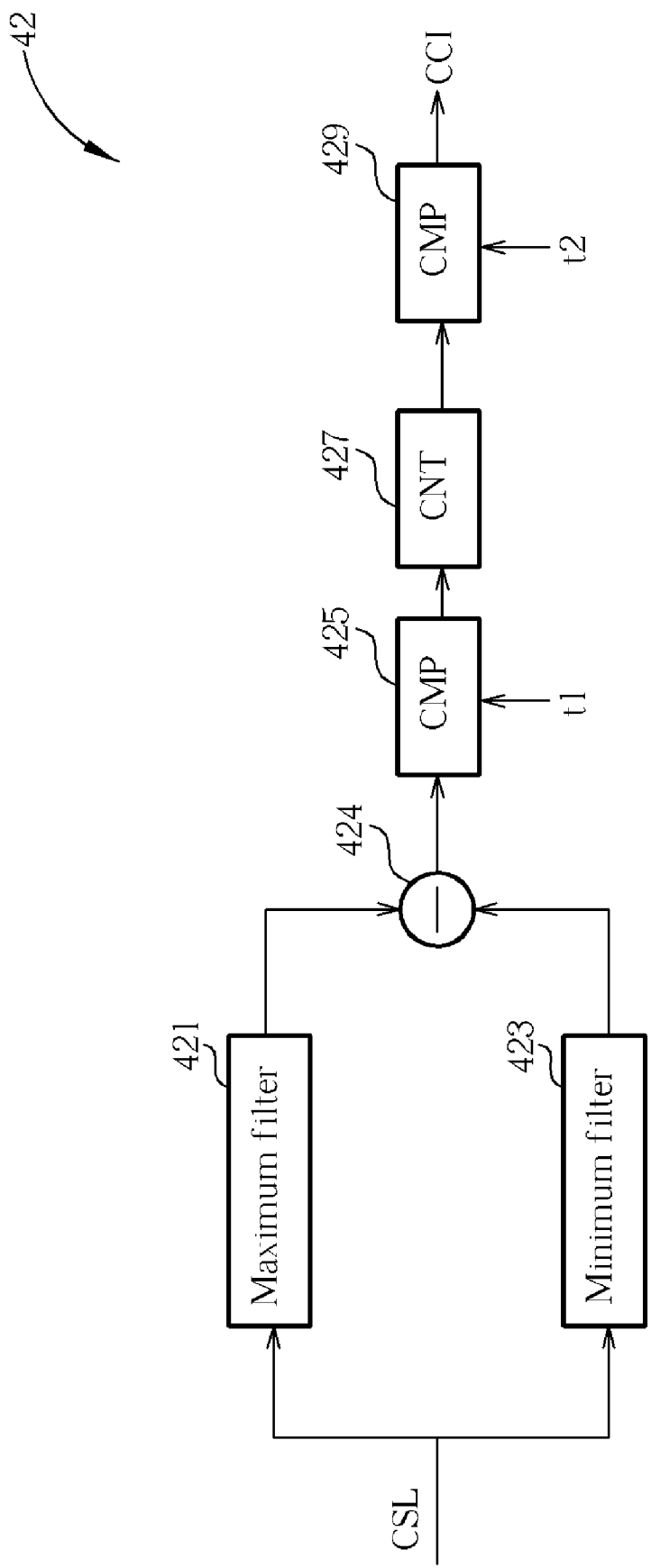
FIG. 5 is a diagram illustrating the co-channel detector of FIG. 3.

Please refer to FIG. 5. FIG. 5 is a diagram illustrating the co-channel detector of FIG. 3. The co-channel detector 42 detects if the compensating level CSL has co-channel interferences according to the difference between the maximum and the minimum of the compensating level CSL and accordingly generates the indication signal CCI. The co-channel detector 42 comprises a maximum filter 421, a minimum filter 423, a third subtractor 424, a fourth CMP 425, a counter (CNT) 427, and a fifth CMP 429. The co-channel detector 42 receives the compensating level CSL outputted from the level compensator 40. The maximum and minimum filters 421 and 423 respectively filter out the maximum and the minimum of the compensating level CSL. When the compensating level CSL has co-channel interference, the difference between the maximum and the minimum of the compensating level CSL becomes higher. When the difference is higher than a first threshold t1, the count value of the counter 427 adds '1', which means the data line is possibly affected with serious DC noises. Otherwise, the count value of the counter 427 subtracts '1'. When the count value of the counter 427 is higher than a second threshold t2, the indication signal CCI is '1', which means a lot of data lines are being affected with serious DC noise. Hence, when the indication signal CCI of the co-channel detector 42 is '1', the DC level SL calculated from the sampling period is not reliable. Meanwhile, it is better to use the compensating level CSL to calculate data for obtaining higher accuracy.

Figure 6:
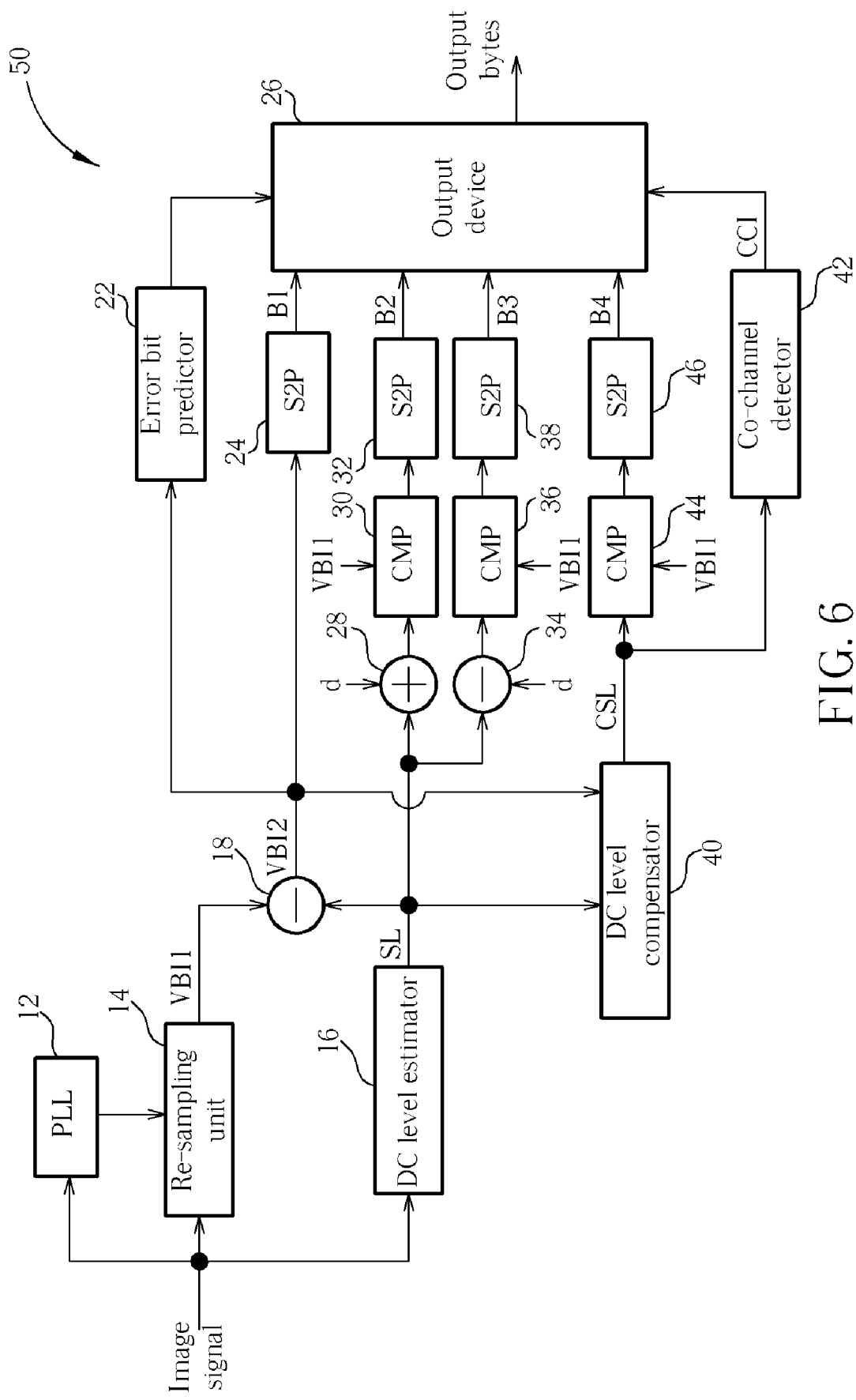
FIG. 6 is a diagram illustrating a data slicer having an error correction device according to a third embodiment of the present invention.
Figure 7:
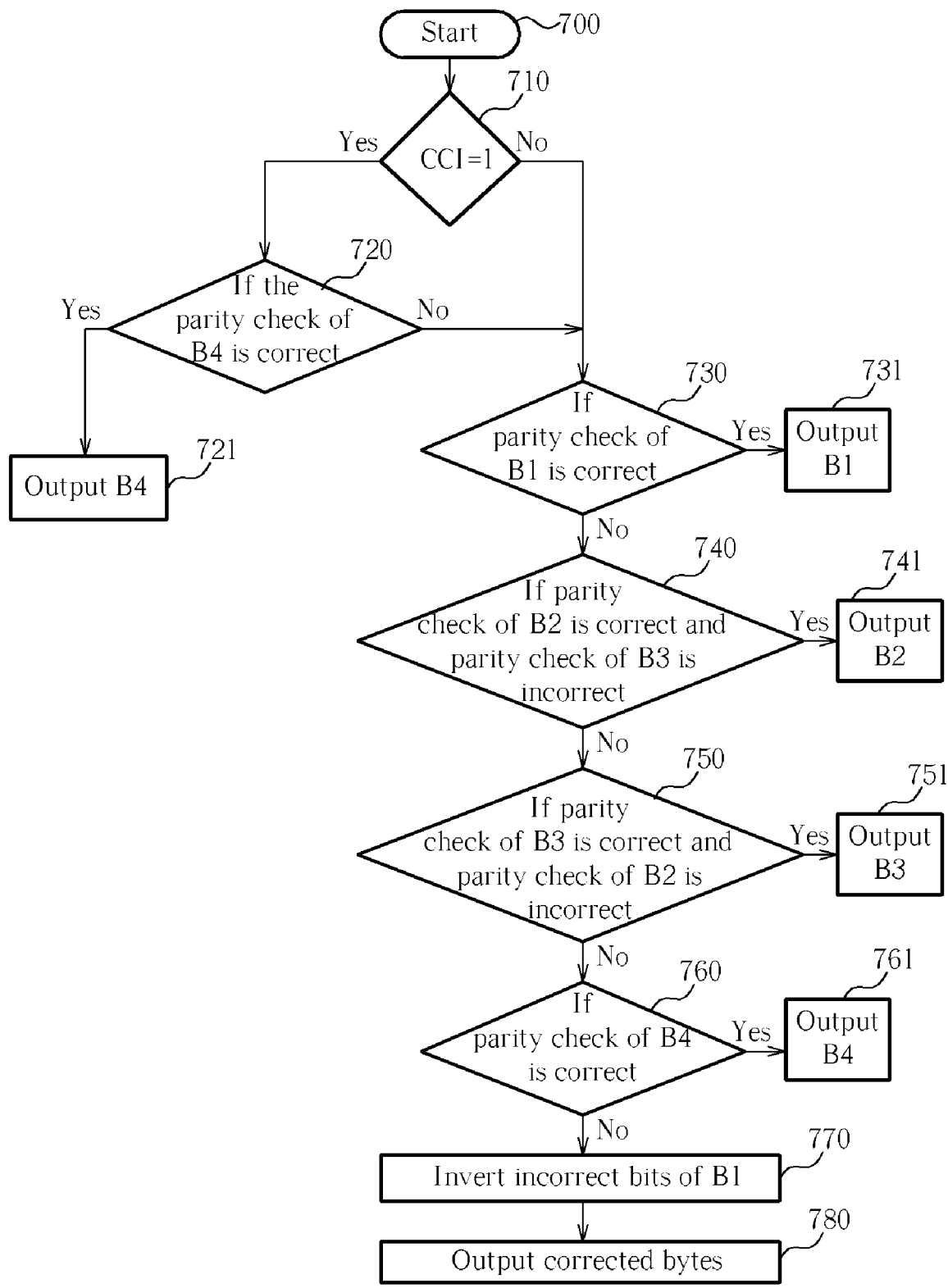
FIG. 7 is a flowchart illustrating the determining procedure of the output device of FIG. 6.

Please refer to FIG. 6 and FIG. 7. FIG. 6 is a diagram illustrating a data slicer having an error correction device according to a third embodiment of the present invention. FIG. 7 is a flowchart illustrating the determining procedure of the output device of FIG. 6. The third embodiment is a combination of the first and the second embodiments of the present invention. The output device 26 of the data slicer 50 respectively receives the first, second, third, and fourth bytes B1, B2, B3, and B4. The determining procedure of the output device 26 of the data slicer 50 is described in FIG. 7 and as follows.

Step 700: Start;

Step 710: Determine if the indication signal CCI outputted from the co-channel detector 42 is '1'. If so, go to step 720; if not, go to step 730;

Step 720: Determine if the parity check of the fourth byte B4 is correct. If so, go to step 721; if not, go to step 730;

Step 721: Output the fourth byte B4;

Step 730: Determine if the parity check of the first byte B1 is correct. If so, go to step 731; if not, go to step 740;

Step 731: Output the first byte B1

Step 740: Determine if the parity checks of the second and the third bytes B2 and B3 are correct. If the parity check of the second byte B2 is correct and the parity check of the third byte B3 is incorrect, go to step 741; if not, go to step 750;

Step 741: Output the second byte B2;

Step 750: Determine if the parity checks of the second and the third bytes B2 and B3 are correct. If the parity check of the third byte B3 is correct and the parity check of the second byte B2 is incorrect, go to step 751; if not, go to step 760;

Step 751: Output the third byte B3;

Step 760: Determine if the parity check of the fourth byte B4 is correct. If yes, go to step 761; if not, go to step 770;

Step 761: Output the fourth byte B4;

Step 770: Invert the error bits of the first byte B1 according to the indication signal outputted from the error bit predictor 22;

Step 780: Output the corrected first byte B1.

To sum up, the data slicer of the present invention comprises an error bit predictor, a DC level compensator, a co-channel detector, and an output device. The data slicer respectively generates four bytes according to four slicing levels, which respectively are DC levels SL, SL+ (the DC level SL added with an offset d), SL− (the DC level SL subtracted with an offset d), and a compensating level CSL. The DC level compensator utilizes filters of adjustable bandwidth to filter and average the data signal subtracted with the DC level for generating the compensating level CSL so as to compensate the DC level SL. The co-channel interference detector determines if the compensating level has co-channel interference. The output device outputs a byte according to the indication signal CCI outputted from the co-channel detector and the parity checks of the four bytes. If the parity checks of the four bytes are incorrect, the output device can correct the byte generated from the DC level according to the indication signal from the error bit predictor to output corrected byte. Therefore, the data slicer of the present invention can improve signal distortion problems and DC level variations under all kinds of interferences and noises.

Those skilled in the art will readily observe that numerous modifications and alterations of the device and method may be made while retaining the teachings of the invention.

What is claimed is:

1. A data slicer having an error correction device, comprising:
   a first subtractor, for subtracting a first level signal from a first data signal to generate a second data signal;
   a first serial to parallel converter, coupled to the first subtractor, for generating a first byte according to a sign bit of the second data signal;
   a level compensator, coupled to the first subtractor, for adjusting an offset of the first level signal according to the second data signal to generate a second level signal;
   a first comparator, coupled to the level compensator, for comparing the second level signal with the first data signal to generate a first comparing signal;
   a second serial to parallel converter, coupled to the first comparator, for converting the first comparing signal to a second byte;
   a co-channel detector, coupled to the level compensator, for determining co-channel interference according to a difference between a maximum and a minimum of the second level signal to generate a first indication signal;
   an error bit predictor, coupled to the first subtractor, for indicating an error bit of the first byte to generate a second indication signal; and
   an output device, for outputting the first byte or the second byte according to the first indication signal, a parity check of the first byte, and a parity check of the second byte, or outputting a corrected first byte according to the second indication signal.

2. The data slicer of claim 1 further comprising:
   a first adder, for adding a predetermined offset to the first level signal;
   a second comparator, coupled to the first adder, for comparing an output signal of the first adder with the first data signal to generate a second comparing signal;
   a third serial to parallel converter, coupled to the second comparator, for converting the second comparing signal to a third byte;
   a second subtractor, for subtracting the predetermined offset from the first level signal;
   a third comparator, coupled to the second subtractor, for comparing an output signal of the second subtractor with the first data signal to generate a third comparing signal; and
   a fourth serial to parallel converter, coupled to the third converter, for converting the third comparing signal to a fourth byte.

3. The data slicer of claim 2, wherein the output device outputs the first byte, the second byte, the third byte, or the fourth byte according to the first indication signal, the parity check of the first byte, the parity check of the second byte, a parity check of the third byte, and a parity check of the fourth byte, or outputs the corrected first byte according to the second indication signal.

4. The data slicer of claim 1, wherein the level compensator comprises:
   a first filter, for filtering bits determined to be 1 from the second data signal;

a second filter, for filtering bits determined to be 0 from the second data signal;

an averaging unit, coupled to the first filter and the second filter, for calculating an average value of output signals of the first filter and the second filter; and a second adder, coupled to the averaging unit, for adding an output signal of the averaging unit to the first level signal to generate the second level signal.

5. The data slicer of claim 1, wherein the co-channel detector comprises:

a third filter, for filtering a maximum of the second level signal;

a fourth filter, for filtering a minimum of the second level signal;

a third subtractor, coupled to the third filter and the fourth filter, for subtracting the minimum of the second level signal from the maximum of the second level signal;

a fourth comparator, coupled to the third subtractor, for comparing an output signal of the third substractor with a first threshold;

a counter, coupled to the fourth comparator, for increasing a count value of the counter when the output signal of the third subtractor is larger than the first threshold; and a fifth comparator, coupled to the counter, for comparing the count value of the counter with a second threshold to output the first indication signal.

6. The data slicer of claim 1, further comprising:

a Phase Lock Loop (PLL), for generating a sampling clock signal;

a re-sampling unit, coupled to the PLL and the first subtractor, for re-sampling an image signal according to the sampling clock signal to generate the first data signal; and a level estimator, coupled to the first subtractor, for generating the first level signal according to the image signal.

7. The data slicer of claim 1, wherein the first data signal is a Vertical Blanking Interval (VBI) data signal.

8. The data slicer of claim 1, wherein the first level signal is DC level signal.

9. A data slicer having an error correction device, comprising:

a first subtractor for subtracting a first level signal from a first data signal to generate a second data signal;

a first serial to parallel converter coupled to the first subtractor for generating a first byte according to a sign bit of the second data signal;

a first adder, for adding a predetermined offset to the first level signal;

a first comparator, coupled to the first adder, for comparing an output signal of the first adder with the first data signal to generate a first comparing signal;

a second serial to parallel converter, coupled to the first comparator, for converting the first comparing signal to a second byte;

a second subtractor, for subtracting the predetermined offset from the first level signal;

a second comparator, coupled to the second subtractor, for comparing an output signal of the second subtractor with the first data signal to generate a second comparing signal;

a third serial to parallel converter, coupled to the second comparator, for converting the second comparing signal to a third byte;

an error bit predictor, coupled to the first subtractor, for indicating an error bit of the first byte to generate a first indication signal; and an output device, for outputting the first byte, the second byte, or the third byte according to a parity check of the first byte, a parity check of the second byte, and a parity check of the third byte, or outputting a corrected first byte according to the first indication signal.

10. The data slicer of claim 9, further comprising:

a PLL, for generating a sampling clock signal;

a re-sampling unit, coupled to the PLL and the first subtractor, for re-sampling an image signal according to the sampling clock signal to generate the first data signal; and a level estimator, coupled to the first subtractor, for generating the first level signal according to the image signal.

11. The data slicer of claim 9, wherein the first data signal is a VBI data signal.

12. The data slicer of claim 9, wherein the first data signal is a DC level signal.

* * * * *